Figure 1:
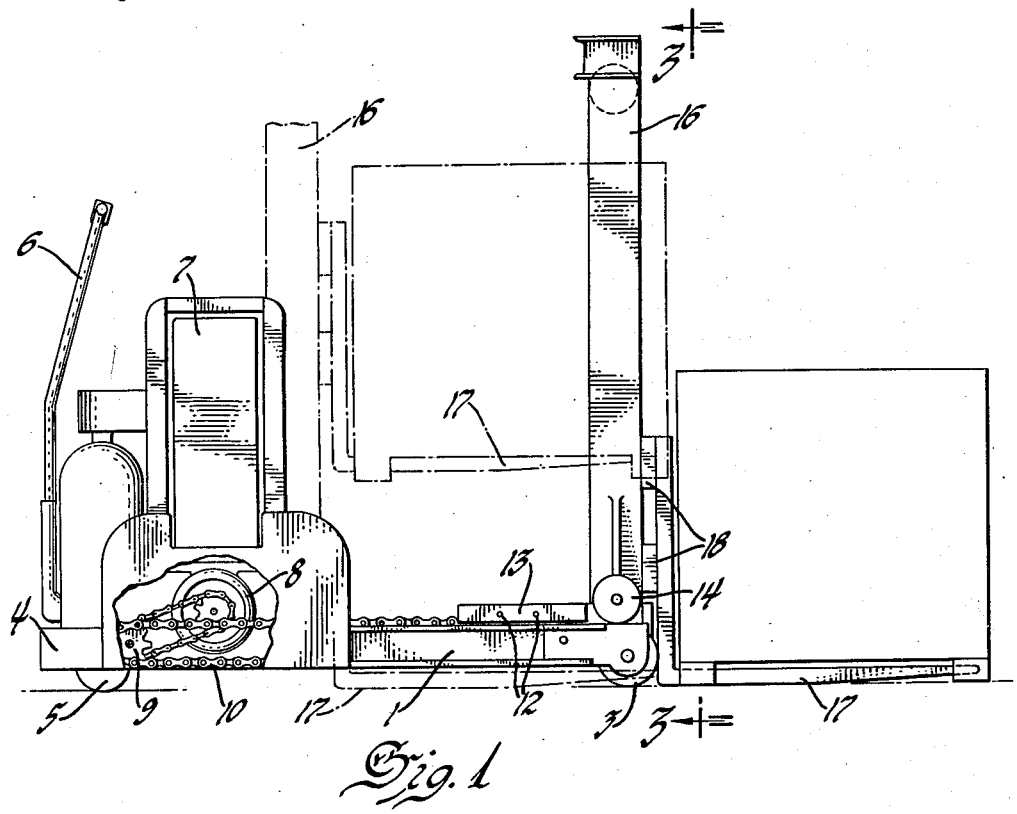

Feb. 2, 1954 H. D. WOUGHTER 2,667,985
INDUSTRIAL TRUCK
Filed Sept. 10, 1949 2 Sheets-Sheet 1

Inventor
Holden D. Woughter
By Willets, Helmig & Baillio
Attorneys

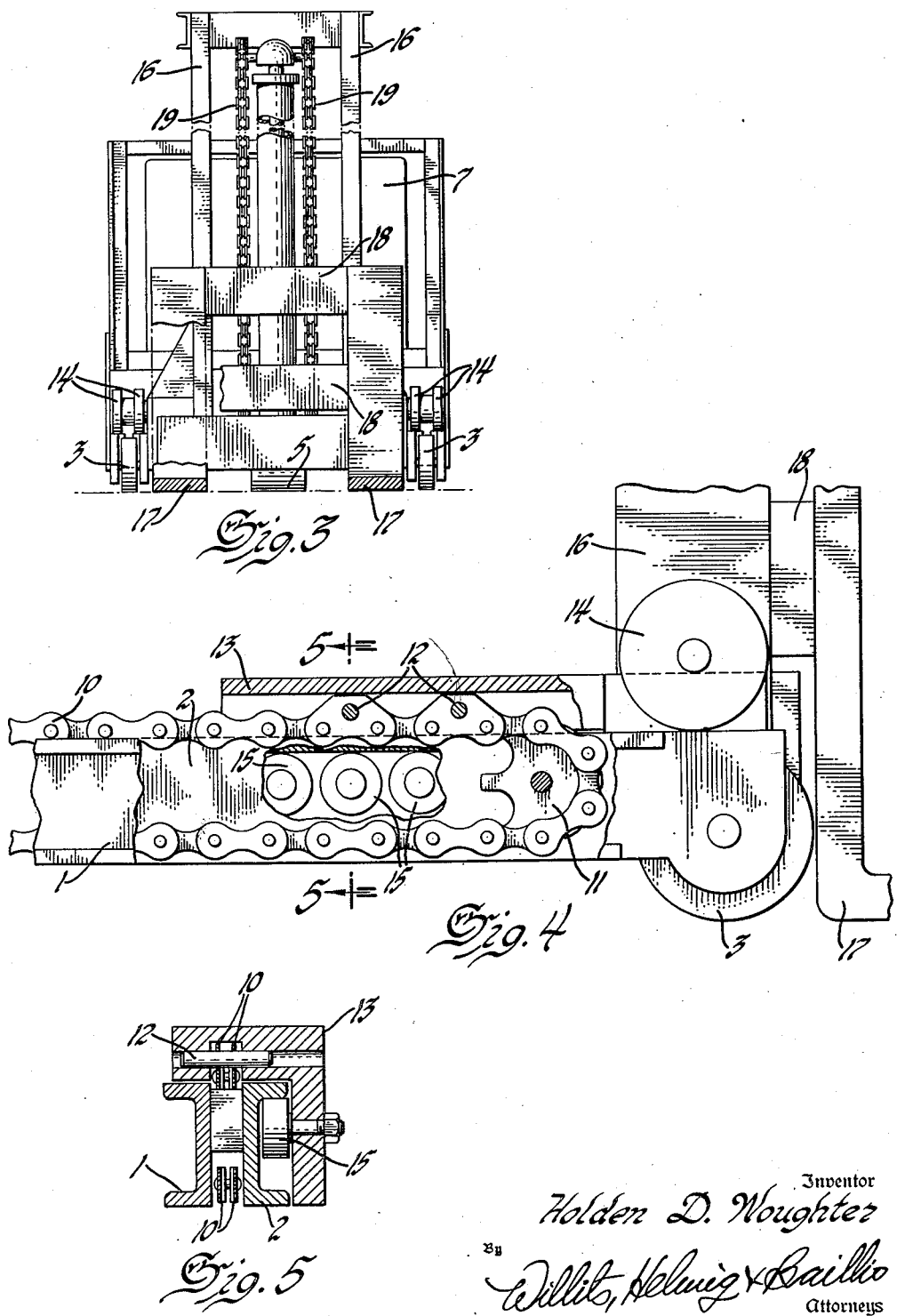

Patented Feb. 2, 1954

2,667,985

UNITED STATES PATENT OFFICE 2,667,985

INDUSTRIAL TRUCK

Holden D. Woughter, Flint, Mich., assignor to General Motors Corporation, Detroit, Mich., a corporation of Delaware Application September 10, 1949, Serial No. 114,977

12 Claims. (Cl. 214—670)

This invention relates to an improved industrial lift truck and one of its primary purposes is to enable better and more profitable use of storage floor area.

Warehousing of stacked pallet loads in rows with access aisles between rows necessitates insertion and removal of individual pallet loads in a direction laterally of the aisle and between adjoining stacks. If a motor driven material handling truck must be manipulated to make a right angle turn in the aisle its overall length calls for a wide aisle even though the truck has a short turning radius and because the conventional lift fork overhangs or projects beyond the wheel base. A wide clearance aisle represents lost storage area.

To conserve space by the use of a narrow aisle it is here proposed to provide a lift truck which can be turned in an aisle only slightly larger than the truck wheel base and whose lifting fork can be retracted during normal truck travel and projected during loading and unloading operations with components so arranged that the weight of the overhanging projected fork and its load is properly balanced to preclude tipping of the vehicle. More particularly the improved lift fork is constructed for the projection and retraction of the lift fork on a continuous straight line whether at its lowest height scraping the floor or at any selected elevated stacking position.

Essentially the load carrying lift fork or platform is telescopically mounted for travel in a horizontal plane relative to the wheeled main frame of the truck.

To provide for straight line travel immediately adjacent the floor level the main frame has an open ended and vertically unobstructed pocket to receive the load carrying fork assembly. The pocket is afforded by constructing the main frame in a form substantially U-shape, the legs of which are supported at their free ends on ground engaging wheels and constitute transversely spaced apart rails or tracks for the lift fork assembly. The cross bar of the U at the opposite end of the frame is also supported on ground engaging wheels and affords a mounting for the motor driven unit opposite the open end of the pocket. The transverse spacing of the main frame side rails is such that the loading fork can be lowered to the floor and lie entirely between the side rails. With the fork in its retracted position the load being transported is positioned above the main frame and between the front and rear wheels.

For unloading in a spot beside an aisle the truck is driven through the aisle to the unloading spot and is then turned transversely of the aisle to bring its projectable fork into alignment with the open storage space in the row. The lift fork with its loaded pallet is first positioned at the desired level and then projected from the truck into the storage position. Thereafter the fork itself is lowered slightly to deposit the pallet either on the floor or in stacked relation to another load, as the case may be, and is then retracted in a straight line until it is fully beyond the pallet whereupon the truck may be swung in the aisle and driven away.

For removing a pallet from any selected storage position in a row the truck with its lift fork retracted is brought into alignment with the pallet and then in succession the fork is projected in a straight line under the pallet; is raised to pick up the load and retracted to bring the loaded fork outside the storage row whereupon the truck is ready to be turned and driven through the aisle. Straight line projection and retraction of the lift fork is of importance for proper handling of pallets and the unobstructed fork receiving pocket is of special significance in connection with the deposit and pickup of loads directly upon the floor.

Figure 2:
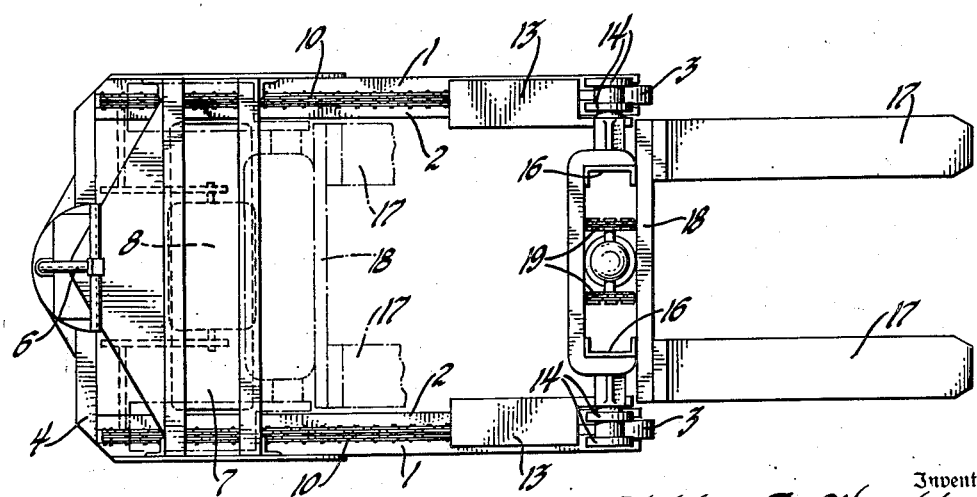

For a better explanation of the invention reference will be made to the accompanying drawings wherein Figure 1 is a side of elevation of the improved industrial truck with the lift fork shown in full lines projected under a pallet resting on the floor and with other retracted positions of the fork shown by broken lines; Figure 2 is a top plan view showing the fork projected in full lines and retracted in broken lines; Figure 3 is an end elevation with parts in section as on line 3—3 of Figure 1; Figure 4 is an enlarged view with parts broken away showing the traveling carriage for the lift fork assembly and Figure 5 is a transverse section taken on line 5—5 of Figure 4.

In the drawings the main frame of the wheeled truck is generally in the form of a U-shape, the projecting legs of which are transversely spaced apart and each consists of a pair of longitudinally extending channel irons 1 and 2 arranged back to back, as best seen in Figure 5. At their free ends the side rails are each mounted on ground engaging wheels 3—3 and at their opposite ends the rails are tied together and the space between them is bridged by transverse frame members 4 mounted on one or more dirigible wheels 5. A steering handle 6 is provided for a dirigible wheel assembly and this handle also mounts the controls for the drive motor mechanism by which the steerable wheel is driven when the vehicle is power operated. The drive unit contemplated will include an electric motor and suitable storage batteries, the latter of which may be housed within a suitable container 7 supported on the cross bar of the main frame. The drive unit is thus located at one end of the vehicle and its weight stabilizes the vehicle in that the vehicle will not tip in unloading of the projected lift fork. Also mounted at the power unit end of the vehicle is an electric motor 8 which has a chain drive for a pair of sprockets, one of which is shown at 9 in Figure 1. These sprockets are located at the two sides of the vehicle each in the space between the channels 1 and 2 of the side rails. An endless chain or cable 10 is engaged by each sprocket and engages at the opposite end of the main frame with a sprocket 11, as seen in Figure 4. Two links in the upper reach of the chain are secured by pins 12 to a traveling carriage member 13, one tracking on each of the side rails by means of an upper roller 14 which rides on the top surfaces of the upper flanges of the rails 1 and 2 and one or more lower rollers are shown at 15 to track on the underside of the innermost channel 2. The carriage also includes the side uprights 16 of a lift tower by which is guided and supported the pallet engaging lift fork or load carrying platform. As shown in the drawings the forks include a pair of L-shaped members 17 transversely spaced apart with their horizontal legs providing the load carrying forks and their vertical legs being tied together by cross bars 18—18 which are guided by the tower risers 16 and are suspended by elevating mechanism, including the chains 19. By controlling the lift mechanism the load supporting platform may be lowered to the floor or raised to any selected height within the limit of the supporting tower. Similarly the lift fork, together with its tower and through its supporting carriage and drive chain 10, may be moved fore and aft between a fully projected position for picking up or depositing a pallet and a fully retracted position within the pocket formed between the side rails of the main frame. Any conventional mechanism may be utilized for operating the lift tower and if desired the lift tower may additionally be arranged for a slight forward and backward tilting movement. However, for most purposes a non-tilt tower will be found satisfactory, particularly since the structure enables the lift fork to be dropped to the floor in all fore and aft positions, including the fully retracted position, sufficient clearance space being provided transversely between the edges of the forks and the adjoining edges of the side frame members.

Whenever the retracted fork carries a pallet which it is desired to deposit on the floor the truck is steered into place transversely of the aisle and the fork is then projected into the storage space and there lowered to deposit and clear the pallet and is withdrawn in a straight line which is in a plane horizontal to the floor line. When fully retracted the fork will be clear of the pallet and the truck may then be turned in the aisle. With no overhang beyond the main frame a minimum of turning clearance will enable the use of narrow aisles.

Similarly when a pallet is to be stacked on a previously deposited load the lift fork is raised to the proper height and after being projected to deposit the load it is withdrawn from under the pallet on a straight line to fully retracted position before the truck is swung in the aisle.

The procedure is reversed for picking up loads and again the direction of travel or projection of the fork is on a straight line under the pallet. In the normal travel of the vehicle the load is carried largely within the wheel base and distributed between the front and rear wheels.

I claim:

1. In a material handling vehicle, a main frame having a portion thereof projecting longitudinally from one end of said vehicle to provide an unobstructed space centrally thereof with an open mouth at one end of the main frame, said space being open vertically from the ground up, road wheels mobily supporting said main frame and positioned on said frame adjacent said open mouth for longitudinal movement and a load carrying platform of a size substantially corresponding to said space and movably mounted on the frame at the sides of said space in telescopic relation therewith for the projection and retraction of the platform through said mouth and into and out of the space, the arrangement being such as to enable platform retraction and projection throughout the entire length between its opposite limits of travel to occur in a plane parallel to and immediately adjacent the floor line engaged by said wheels.

2. In a lift truck for load carrying pallets and the like, a wheeled frame having a pair of transversely spaced side rails projecting from one end thereof affording a vertically unobstructed pocket therebetween extending upwardly from the ground, a carriage mounted to ride to and fro horizontally on said rails into and out of said pocket and a pallet lift platform constituting a part of the carriage, said vertically unobstructed pocket enabling the lift platform to be lowered through the pocket to ground level and to be projected and retracted on a straight line at such level.

3. A material handling vehicle especially adapted for use in the storage of low ground clearance pickup loads beside an aisle comprising a truck having front and rear ground wheels and being longitudinally separated into a rear power unit section and a front load transporting section, said load transporting section including a pair of transversely spaced side rails supported on said front ground wheels, the space between said rails being vertically and laterally unobstructed forward of said power unit section, a loading platform of a size substantially corresponding to said space, and platform supporting guides tracking on said rails and providing horizontally telescopic travel of the platform into and out of said space adjacent the ground for loading and unloading operations while the vehicle itself is stationary.

4. In a material handling vehicle, a wheeled truck having a frame, parallel spaced rails projecting from one end of said frame to form a U-shaped pocket whose mouth is at one end of the truck frame and which within the sides of the pocket is entirely free of vertical obstruction from the ground up, and a retractible-projectable load carrying platform of a longitudinal size substantially corresponding with the length of said pocket, said platform being telescopically mounted on the truck for vertical travel through the pocket to positions adjacent the ground and horizontal travel to and from a retracted position entirely within the longitudinal extent of the pocket at any vertical position of said platform, the top of said rails being substantially the same height as the top of said platform when in its lowered position.

5. A material handling vehicle especially adapted for use in the storage of low ground clearance pickup loads beside an aisle comprising a truck having a power unit section and a load transporting section, said load transporting section including a pair of rails projecting outwardly from said power section in parallel spaced relation, the space between said rails forming an open ended pocket vertically unobstructed from the ground up, platform supporting guides tracking on said rails, and a vertically movable load platform of a size substantially corresponding to said space mounted on said guides for horizontal telescopic travel into and out of said space adjacent the ground for loading and unloading operations while the vehicle itself remains stationary, said rails being disposed at substantially the same height as said load platform when in its lowered position.

6. A material handling vehicle especially adapted for use in the storage of low ground clearance pickup loads beside an aisle comprising a truck having front and rear ground wheels and being longitudinally separated into a rear power unit section and a front load transporting section, said load transporting section including a pair of transversely spaced side rails disposed longitudinally of said vehicle and projecting forwardly from said power unit section adjacent the ground, said front ground wheels being disposed adjacent the outer ends of said side rails to support said load transporting section, the space between said rails being vertically and laterally unobstructed forward of said power unit section from the ground up, a load platform of a size substantially corresponding to said space, and platform supporting guides tracking on said rails and providing telescopic travel of said platform in a substantially horizontal plane into and out of said space adjacent the ground for loading and unloading operations while the vehicle itself remains stationary.

7. A material handling vehicle especially adapted for use in the storage of low ground clearance pickup loads beside an aisle comprising a truck longitudinally separated into a rear power unit section and a front load transporting section, said power unit section having dirigible road wheels disposed thereunder for supporting said power unit section, said load transporting section including a pair of transversely spaced side rails disposed longitudinally of said vehicle and projecting forwardly from said power unit section adjacent the ground, a horizontal axle mounted transversely on each of said rails adjacent the outer ends thereof, a road wheel mounted on each of said axles for rotation in a vertical plane disposed longitudinally of said vehicle, the space between said rails being vertically and laterally unobstructed forward of said power unit section from the ground up, a load platform of a size substantially corresponding to said space, and platform supporting guides tracking on said rails and providing telescopic travel of said platform in a substantially horizontal plane into and out of said space adjacent the ground for loading and unloading operations while the vehicle itself remains stationary.

8. A material handling vehicle especially adapted for use in the storage of low ground clearance pickup loads beside an aisle comprising a truck having front and rear ground wheels and being longitudinally separated into a rear power unit section and a front load transporting section, said load transporting section including a pair of transversely spaced side rails supported on said front ground wheels, the space between said rails being vertically and laterally unobstructed forward of said power unit section, a carriage movably mounted on said rails, a load lifting and carrying platform supported by said carriage for vertical movement thereon independently of the longitudinal position of said carriage, said carriage being adapted for longitudinal movement on said rails to move said platform into and out of said pocket independently of the elevation of said platform, the tops of said rails being at substantially the same height as the top of said platform when in its fully lowered position whereby said fully lowered platform may be moved horizontally into the space between said rails when in a fully loaded condition.

9. In a lift truck for load carrying pallets and the like, a vehicle frame having a pair of elongated side rails projecting transversely from one end thereof in parallel spaced relation to form a pocket therebetween, said pocket being vertically unobstructed from the ground up, a ground wheel rotatably mounted adjacent each of the outer ends of said side rails, said wheels being disposed for rotation in a plane longitudinal of said rails and being positioned to engage the ground and support said truck, a carriage mounted on said rails for horizontal movement longitudinally of said truck into and out of said pocket, and a pallet lift platform supported by said carriage for movement therewith, said platform being adapted for vertical movement from the ground up on said carriage independently of the position of said carriage, said rails being disposed at substantially the same elevation as the lowered platform.

10. In a lift truck adapted to carry loaded pallets and the like while traveling in a direction longitudinal of said truck, a vehicle frame having power means mounted thereon, a pair of elongated side rails projecting from one end of said frame substantially parallel to said line of travel, said rails being spaced to form a pocket therebetween which is vertically unobstructed from the ground up, a dirigible ground wheel disposed under said power means, a ground wheel rotatably mounted adjacent each of the outer ends of said side rails, said wheels being disposed longitudinally of said rails for rotation in planes parallel to said line of travel and being positioned to engage the ground and support said rails, a carriage mounted on said rails for horizontal movement longitudinally of said truck into and out of said pocket, a pallet lift platform supported by said carriage for movement therewith, said platform being adapted for vertical movement from the ground up on said carriage independently of the position of said carriage, the tops of said rails being at substantially the same height as the top of said platform when it is in its lowered position.

11. A material handling vehicle especially adapted for use in the storage of low ground clearance pick-up loads beside an aisle comprising a truck having a power unit section and load transporting section supported by said power unit section to project outwardly therefrom, said load transporting section including first support means carried by said power unit section and being disposed along one side thereof, said first support means including a pair of parallel spaced rails, the space between said rails forming an open ended pocket vertically unobstructed from the ground up, a second support means carried by said first support means and including a pallet lift platform of a size substantially corresponding to said space, one of said support means being independently adaptable to move said platform in a vertical direction, the other of said support means being adaptable to extend and retract said platform in a horizontal direction into and out of said space for loading and unloading said vehicle.

12. In a material handling vehicle of the type described in claim 11 in which the other of said support means is adaptable to extend and retract said platform in a horizontal direction into and out of said space in all vertical positions of said platform for loading and unloading said vehicle.

HOLDEN D. WOUGHTER.

References Cited in the file of this patent

UNITED STATES PATENTS

| Number | Name | Date |
| --- | --- | --- |
| 1,900,569 | Lederer | Mar. 7, 1933 |
| 2,092,663 | Bach | Sept. 7, 1937 |
| 2,122,992 | Pride | July 5, 1938 |
| 2,126,289 | Schroeder | Aug. 9, 1938 |
| 2,320,601 | Howell | June 1, 1943 |
| 2,324,817 | Bratley | July 20, 1943 |
| 2,366,378 | Barrett | Jan. 2, 1945 |
| 2,437,806 | Dempster | Mar. 16, 1948 |
| 2,451,943 | Gunning | Oct. 19, 1948 |
| 2,492,608 | Wilms | Dec. 27, 1949 |
| 2,621,811 | Lull | Dec. 16, 1952 |